(12) United States Patent
Wheeler, Jr. et al.

(10) Patent No.: US 7,606,219 B2
(45) Date of Patent: *Oct. 20, 2009

(54) SERVICES CONTROL POINT SELECTION IN AN ADVANCED INTELLIGENT NETWORK

(75) Inventors: David F. Wheeler, Jr., Laurel, MD (US); David C. Ball, Parkton, MD (US)

(73) Assignee: Verizon Services Corp., Arlington, VA (US)

( * ) Notice: Subject to any disclaimer, the term of this patent is extended or adjusted under 35 U.S.C. 154(b) by 708 days.

This patent is subject to a terminal disclaimer.

(21) Appl. No.: 10/964,014

(22) Filed: Oct. 13, 2004

(65) Prior Publication Data

US 2005/0063366 A1    Mar. 24, 2005

Related U.S. Application Data

(63) Continuation of application No. 09/314,854, filed on Mar. 27, 1998, now Pat. No. 6,831,914.

(51) Int. Cl.
*H04L 12/66* (2006.01)

(52) U.S. Cl. ............... 370/352; 370/351; 370/389; 370/392; 370/522; 379/221.08; 379/221.09; 379/221.1; 379/221.11; 379/221.12

(58) Field of Classification Search ............... 370/351, 370/352, 389, 392, 522; 379/221.08, 221.09, 379/221.1, 221.11, 221.12
See application file for complete search history.

(56) References Cited

U.S. PATENT DOCUMENTS

| | | | |
|---|---|---|---|
| 5,418,844 A | 5/1995 | Morrisey et al. | |
| 5,425,091 A | 6/1995 | Josephs | |
| 5,469,500 A | 11/1995 | Satter et al. | |
| 5,519,772 A * | 5/1996 | Akman et al. | 379/221.08 |
| 5,533,115 A * | 7/1996 | Hollenbach et al. | 379/221.11 |
| 5,546,574 A | 8/1996 | Grosskopf et al. | |
| 5,553,130 A | 9/1996 | Turner | |
| 5,572,581 A | 11/1996 | Sattar et al. | |
| 5,572,583 A | 11/1996 | Wheeler, Jr. et al. | |
| 5,579,318 A | 11/1996 | Reuss et al. | |

(Continued)

*Primary Examiner*—William Trost, IV
*Assistant Examiner*—Toan D Nguyen (57) ABSTRACT

In a telephone network, an intelligent peripheral (IP) provides a variety of auxiliary call processing functions, such as announcement playback and digit collection. In response to each call, the IP queries a service control point (SCP) over a data network, for instructions as to processing of the call. The IP runs software to select one SCP for control of each call, from a number of SCPs on the data network, and obtain the requisite instructions for the call from the identified SCP. For each call, the IP software identifies the telephone number of the subscriber and uses the NPA-NXX and D digits from that number to access a first mapping table and obtain a CLLI code identifying an SCP. Using the CLLI code from the first table, the IP software accesses a second mapping table to obtain the CLLI code for the mate to the identified SCP. Using the two CLLI codes, the IP also goes through the second table to obtain all of the Internet Protocol addresses for the two SCPs. For each call, the IP selects one of the identified addresses for a mated pair and queries an SCP using that address. The IP software runs an algorithm to select different ones of the addresses for processing of different calls and thereby balance the load that the IP places on the various SCP data ports.

22 Claims, 10 Drawing Sheets

U.S. PATENT DOCUMENTS

| | | |
|---|---|---|
| 5,579,384 A | 11/1996 | Seymour |
| 5,583,920 A | 12/1996 | Wheeler, Jr. |
| 5,594,789 A | 1/1997 | Seazholtz et al. |
| 5,600,710 A | 2/1997 | Weisser, Jr. et al. |
| 5,692,033 A | 11/1997 | Farris |
| 5,712,903 A | 1/1998 | Bartholomew et al. |
| 5,751,961 A | 5/1998 | Smyk |
| 5,754,630 A | 5/1998 | Srinivasan |
| 5,825,860 A | 10/1998 | Moharram |
| 5,878,113 A | 3/1999 | Bhusri |
| 5,915,008 A | 6/1999 | Dulman |
| 5,999,610 A * | 12/1999 | Lin et al. ............... 379/207.02 |
| 6,014,437 A | 1/2000 | Acker et al. |
| 6,038,305 A | 3/2000 | McAllister et al. |
| 6,138,110 A * | 10/2000 | Jahn et al. ...................... 707/1 |
| 6,169,793 B1 | 1/2001 | Godwin et al. |
| 6,195,425 B1 | 2/2001 | Farris |
| 6,243,451 B1 * | 6/2001 | Shah et al. ............. 379/201.03 |

* cited by examiner

| TNAG Start Range | TNAG End Range | CLLI |
|---|---|---|
| 3012360 | 3012369 | WashingtonDC_SCP1 |
| 3018900 | 3018909 | HyattsvilleMD_SCP1 |
| 3017760 | 3017765 | BaltimoreMD_SCP1 |
| 3015980 | 3015989 | PikeMD_SCP1 |

SERVICES CONTROL POINT SELECTION IN AN ADVANCED INTELLIGENT NETWORK

CROSS-REFERENCE TO RELATED APPLICATIONS

This application is a Continuation of U.S. application Ser. No. 09/314,854, entitled SERVICES CONTROL POINT SELECTION IN AN ADVANCED INTELLIGENT NETWORK, which was filed on Mar. 27, 1998 now U.S. Pat. No. 6,831,914, the entire contents of which are herein incorporated by reference.

TECHNICAL FIELD

The present invention relates to an advanced intelligent telephone network utilizing a peripheral platform to connect to multiple Service Control Points to perform various functions related to providing subscribers an array of telephone services.

ACRONYMS

The written description uses a large number of acronyms to refer to various services and system components. Although generally known, use of several of these acronyms is not strictly standardized in the art. For purposes of this discussion, acronyms therefore will be defined as follows:

Advanced Intelligent Network (AIN)
Central Office (CO)
Common Channel Inter-office Signaling (CCIS)
Common Language Location Identifier (CLLI)
Call Processing Record (CPR)
Data and Reporting System (DRS)
Integrated Service Control Point (ISCP)
Integrated Services Digital Network (ISDN)
Intelligent Peripheral (IP)
Local Area Network (LAN)
Multi-Services Application Platform (MSAP)
Service Control Point (SCP)
Service Creation Environment (SCE)
Service Logic Program (SLP)
Service Management System (SMS)
Service Node (SN)
Service Switching Point (SSP)
Signaling Transfer Point (STP)
Simplified Message Desk Interface (SMDI)
Transaction Capabilities Applications Part (TCAP)
Transmission Control Protocol/Internet Protocol (TCP/IP).

BACKGROUND ART

While the advanced intelligent network (AIN) concept continues to evolve, it has now matured to the point where AIN networks are widely used. AIN networks provide network operators with considerable flexibility and economy in structuring their product offerings and providing their customers with numerous telephone conveniences and services. As a result, telephony services have become markedly sophisticated.

With AIN, many of the "intelligent" call processing functions can be off loaded from the generic switches to peripheral or adjunct computer systems (e.g., service control point), thereby reducing the switches' processing burdens. The service control points (SCPs) assist the switches with the routing of calls and by providing data to implement customized calling features. The SCP is essentially a central control for the intelligent network. Because of the criticality of the SCP's role, the SCP sites can be implemented in mated pairs in which two identical SCPs are "paired." Each SCP in the pair stores a duplicate copy of the subscribers' call processing data, for the customers serviced through the particular pair of SCPs. In effect, if one SCP site fails, the mate continues to provide the same service to the subscribers.

In an AIN network, the SCPs rely on peripheral platforms to provide auxiliary call processing capabilities when instructed to do so. In general terms, a peripheral platform supports the execution of service logic programs or application processes. Specifically, peripheral platforms handle key functions such as announcements and digit collection. The use of peripheral platforms negates the need for switched based announcements, which have a number of serious drawbacks. One drawback involves incurring enormous expense in having to upgrade all telephone switching offices when more announcement capacity is required. Another disadvantage is the need to rely on a single switch vendor for such upgrades. Also, any service specific announcements must be loaded onto each switch providing the particular AIN service. Loading new announcements on large numbers of switching systems is time consuming and may require the services of expert personnel provided only by the switch equipment vendor.

The use of peripheral platforms are thus desirable because these drawbacks are eliminated. They provide readily adaptable means to add and change announcements to an AIN, without direct addition of equipment in each central office switching system. The platforms also serve to centralize announcement capabilities to some extent, so that announcement reprogramming does not always require reprogramming of equipment for every single switch through which an enhanced service is offered. Also, such platforms are easier to upgrade to add call processing capabilities, such as speech recognition and speaker identification.

In a typical network incorporating a peripheral platform, a signaling communication system for two-way communications of data messages interconnects a number of central office switching systems and connects the central office switching systems to the services control point. A separate signaling communication system provides two-way data signaling communications between the peripheral platform and multiple service control points. That is, the later signaling communication system is separate from the first signaling communication system, the central office switching systems, and the trunk circuits interconnecting the central office switching systems. The second signaling communication system also permits exchange of messages between the peripheral platforms, if more than one are present.

An AIN network may also include a plurality or peripheral platforms—or in more advanced networks, intelligent peripherals (IPs). One peripheral platform may connect to one switching system or to a number of the switching systems. Each such peripheral platform provides one or more auxiliary call processing capabilities in response to instructions from the SCP.

The typical AIN architecture allows the switched transport network to interact with database systems such as SCPs and peripheral platform such as IPs for obtaining information, data and support operations. This occurs when the switching network is triggered to access the database or Peripheral by some condition that arises during processing of a telephone call.

IPs and similar platforms have become integral components in the AIN architecture in the delivery of advanced features and services. U.S. Pat. No. 5,572,583 to Wheeler discloses an IP offering one or more auxiliary call processing features in response to instructions from the SCP. The IP provides such enhanced call processing functions as announcement and digit collection, voice recognition, facsimile mail, and voice mail. U.S. Pat. No. 5,469,500 to Satter et al. discloses a processor for use in a telephone network, both as an IP controlled by a SCP and as a service node (SN) operating autonomously. The call processor includes a service creation environment (SCE) and stores call processing instructions in service logic tables for use by the service logic executive to handle and route calls.

Current AIN configurations assign one IP to a SCP. The SCPs control the intelligent peripherals in a master-slave relationship. The SCPs delegate various call processing tasks to their assigned IPs. Because of this one-to-one mapping of SCP to IP, the complexity with respect to operations and management of the AIN network significantly increases as more SCPs are added. In essence, the AIN network does not scale well under this scenario. Other inefficiencies result as well. A typical IP implementation involves the use of several minicomputers, networking and internetworking equipment which are expensive. Also, underutilized IPs are expensive from a maintenance and support perspective.

Furthermore, there is no readily viable method to provide regionalized services because of the single SCP to single IP mapping. For example, if a subscriber has traveled out of region, she would incur toll charges to access her service through interaction with an IP operating in her home region. As a consequence of the inflexibility of the IP/SCP configuration, the AIN network is inefficient.

Therefore, a need exists to better utilize IPs in the AIN. The configuration of the IP should promote optimal use of costly network resources. The configuration should more efficiently allot resources of an IP to multiple SCPs. In addition to providing economic savings, the modified network should also facilitate regionalized services and accommodate local calling scenarios where possible. By creating a regionalized approach, the out of region traveler in the previous example would be able to access her service via a local IP.

DISCLOSURE OF THE INVENTION

The present invention meets the above noted needs by providing a peripheral platform (e.g., IP) with the capability to handle data connections to multiple service control points. The peripheral platform is connected to one or more switching systems to provide call processing functions. The terms network ports and network interfaces, herein, are used synonymously to refer to physical and logical components necessary to achieve data communication, for example, to enable communications with an SCP. In other words, the invention pertains to the selection of network interface addresses that map to physical network ports and/or logical network ports. The peripheral platform has this functionality to select one SCP among multiple SCPs, and to select a port or interface on the SCP, using an algorithm (e.g., round-robin scheme) that distributes the data traffic loads from the peripheral platform among the network ports of the SCPs' call processors.

Essentially, the processor in the peripheral platform queries a database (SCP Locator Database) which contains data records of SCP selection data to ultimately retrieve a network interface address, such as an Internet Protocol address, associated with the selected SCP. The SCP selection data may include data records of telephone digits related to the telephone stations, codes related to identification of the SCPs, and network addresses of the SCP network interfaces. The SCP Locator Database preferably resides within the peripheral platform but may reside in an SCP. Once the processor of the peripheral platform obtains a SCP network interface address, the processor establishes a data connection between the peripheral platform's data communication interface and the SCP network interface.

In one implementation of the invention, a plurality of SCPs are grouped (called a "SCP Mated" group) in which a condition or the grouping is that each of the SCPs, in the group, has identical functionalities to any other service control point within the mated SCP group. If the group comprises two SCPs, it is termed a SCP Mated Pair. The algorithm implemented by the IP, selects one such mated group for a particular call, and selects a port on one of the SCPs of the group. The IP varies the port selection on different communication sessions to the mated group, to balance the load on the SCPs within the group.

The present invention is advantageous in that it provides the ability to select a particular SCP among multiple SCPs; and thus, permits consolidation of services controlled by multiple SCPs onto one peripheral platform.

Another advantage of the invention is the capability to distribute the call processing load among multiple ports in a SCP site.

A further advantage arises from the reduction of hardware and software components required to implement an AIN with peripheral platforms.

Yet another advantage is the ability to situate peripheral platforms within the AIN to effect a more centralized topology, thereby achieving a regionalized approach to providing subscriber services and features.

In addition, the present invention has the advantage of permitting local calling scenarios when a subscriber, who is out of region, desires to access her services, without long distance routing to an intelligent peripheral.

Additional objects, advantages and novel features of the invention will be set forth in part in the description which follows, and in part will become apparent to chose skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention provides for more efficient implementation of an AIN type network by streamlining the operations of an intelligent peripheral. The IP, in a preferred embodiment, employs three minicomputers that house processing capabilities and data communication interfaces. The IP maintains data connectivity to multiple SCP Mated Pairs. Each SCP is identified by a Common Language Location Identifier (CLLI) code—which uniquely identifies AIN components using alphanumeric characters.

A local database, referred to as SCP Locator Database, captures in a table the CLLI codes for all connected Mated SCP Pairs along with the Internet Protocol addresses of all the SCP network Interfaces (i.e., ports). Another database table includes data on the mapping of a subscriber NPA-NNX plus D digit to the subscriber's serving SCP. The IP runs a program that interacts with this local database to select one SCP mate from a number of SCP Mated Pairs. The selection process load balances across the SCP network interfaces by using a round-robin distribution scheme. To better understand this embodiment of the present invention, it is useful to first examine the architecture of the AIN implementation in detail.

Figure 1:
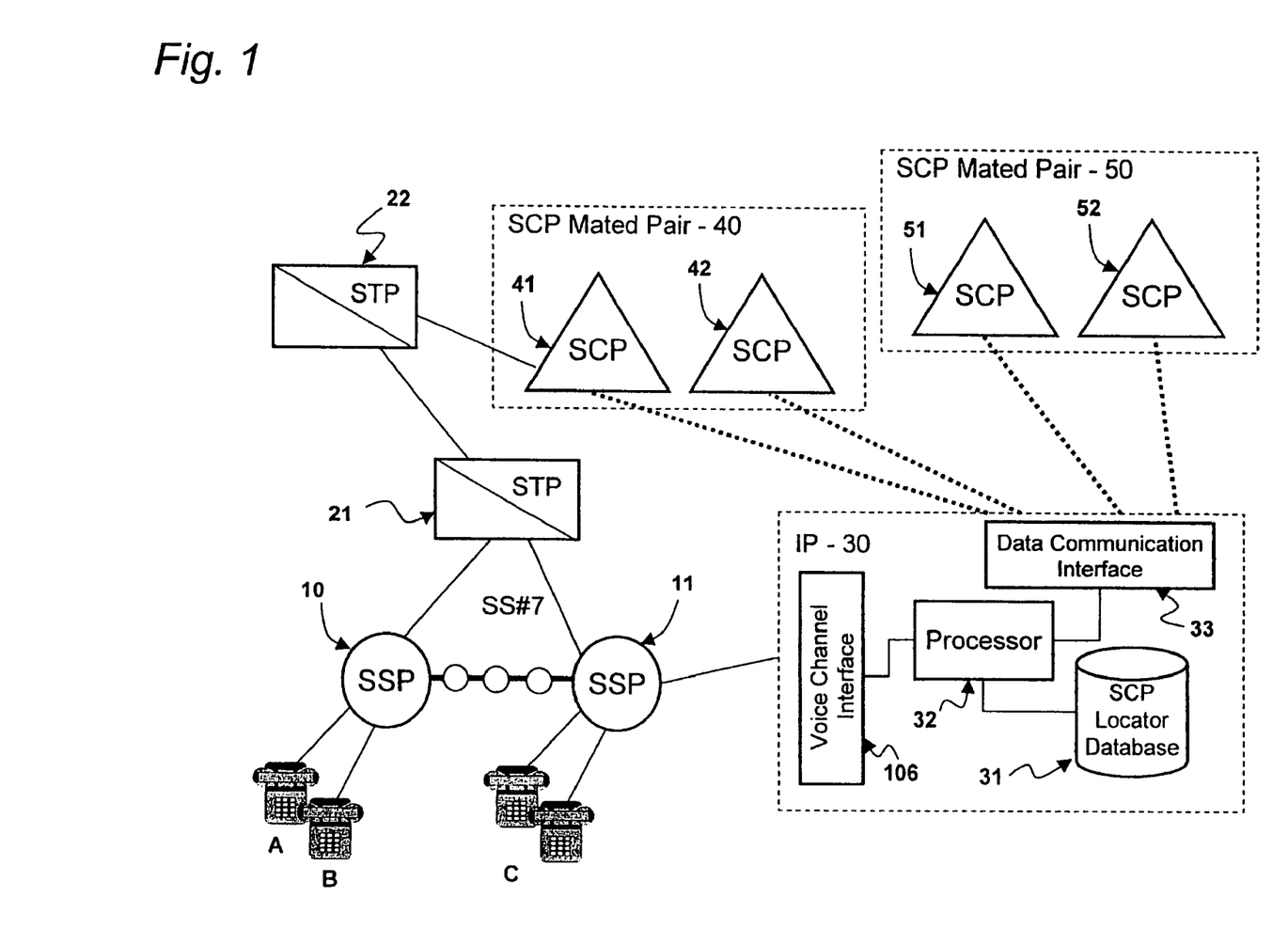
FIG. 1 is a schematic block diagram of a telephone communication portion of an Advanced Intelligent Network in accord with the present invention.

In a preferred embodiment of the Advanced Intelligent Network, shown in FIG. 1, each central office switching system (CO) 10, 11 is labeled as an "SSP." The Service Switching Points, referred to as SSPs, are appropriately equipped programmable switches present in the telephone network, which recognize AIN type calls, launch queries to the SCP and receive commands and data from the SCP to further process the AIN calls. In the illustrated embodiment, the SSPs are end offices.

As shown in FIG. 1, all of the end office switches 10, 11 are equipped and programmed to serve as SSPs. The illustrated embodiment is perhaps an ideal implementation which would make a variety of AIN services widely available at the local office level throughout the network. Other AIN implementations provide the SSP functionality only at selected points in the network, and end offices without such functionality forward calls to one of the SSPs.

An SSP capable central office switching system typically consists of a programmable digital switch with Common Channel Inter-office Signaling (CCIS) communications capabilities. One example of an SSP capable CO switch is a 5ESS type switch manufactured by AT&T; but other vendors, such as Northern Telecom and Seimens, manufacture comparable digital switches which could serve as the SSPs.

With reference to FIG. 1, the SSP type COs 10 and 11 connect to a mated pair of local area STPs 21 only one of which is shown. The connections to the STPs are for signaling purposes. As indicated by the circles below STP 21, the local area STP can connect to a large number of the SSPs. The central office SSPs are interconnected to each other by trunk circuits (illustrated in FIG. 1 as bold lines) for carrying telephone services.

The local area STP 21, and any number of other such local area STPs (not shown) typically communicates with a mated pair of state or regional STPs 22 one of which appears in the drawing. The state or regional STP 22 in turn provides communications between the local STPs as well as with the SCP 41. The STP hierarchy can be expanded or contracted to as many levels as needed to serve any size area covered by the AIN and to service any number of stations and central office switches. Also, certain switching offices within the network, whether SSPs or not, may function primarily as tandem type offices providing connections between trunk circuits only.

Furthermore, there could be one or more SCPs per state to avoid overloading existing CCIS data links. Alternatively, the SCP could be implemented on a LATA by LATA basis or on a regional operating company basis; i.e., one database for the entire geographic area serviced by one of the Regional Bell Operating Companies. In fact, if federal regulations permitted, the database service could become nationwide. However, as telephone companies develop and deploy more services utilizing SCPs and more customers subscribe to such services, the number of SCPs rises and the area serviced by each mated pair of SCPs shrinks.

The links between the COs and the local area STP 21 are typically SS7 type CCIS interoffice data communication channels. The local area STPs are in turn connected to the regional STP 22 via SS7 packet switched links. The regional STP 22 also communicates with the SCP 41 via a packet switched SS7 link. The STPs essentially comprise packet switches, designed to switch SS7 protocol packets.

The above described data signaling network between the SSP type central offices and the SCP is preferred, but other signaling networks could be used. For example, instead of the SS7 links and STPs, a number of central office switches and an SCP could be linked for data communication by a token ring network. Also, the SSP capability may not always be available at the local office level, and several other implementations might be used to provide the requisite SSP capability.

The AIN network further includes one or more IPs. An IP in general is a computing system that provides auxiliary call processing capabilities in assistance to the SCPs. FIG. 1 illustrates the two scenarios in which the IP 30 communicates with the SSPs 10, 11. If the IP connects directly to an office such as SSP 11, the SSP simply activates appropriate internal switching elements to establish the telephone call connection channel between the caller and the IP's voice channel interface 106, (discussed in more detail with regard to FIG. 3). If the IP does not connect to the particular office, such as the SSP 10, the instruction received from the SCP will provide sufficient information to route the call through other switching systems to the IP. When the call reaches the IP, the IP selects an SCP and obtains instructions from that SCP as to how to process the call.

Certain call processing events, or "Points-in-call", trigger an SSP to query an SCP and obtain information as to how to complete call processing. The messages transmitted between the SSPs and the SCP are all formatted in accord with the Transaction Capabilities Applications Part (TCAP) of the SS7 protocol. TCAP provides standardized formats for various query and response messages. Each query and response includes data fields for a variety of different pieces of information relating to the current call. For example, an initial TCAP query from the SSP includes, among other data, a code identifying the type of event which triggered the query and a "Service Key" which includes the relevant subscriber's address. TCAP also specifies a standard message response format including routing information, such as primary carrier ID, alternate carrier ID and second alternate carrier ID and a routing number and a destination number.

In the preferred embodiment, at least two SCP Mated Pairs 40, 50 maintain signaling data connectivity to a single, common IP. For purposes of illustration, FIG. 1 shows the SCPs within a SCP Mated Pair in close proximity. It is important to note that the figure provides a high-level, logical diagram of the AIN components; in actuality, the SCPs can be physically quite distant. All of the SCPs 41, 42, 51, 52 have their own Transmission Control Protocol/Internet Protocol (TCP/IP) data communication link to the IP site, as represented by the heavy dashed lines. As shown, the IP site 30 houses the SCP Locator database 31, a processor 32, and a data communication interface 33 (FIG. 3) details the preferred IP components). The IP's processor executes software to select a mated pair site as between pairs 40 and 50. Further, the software directs the processor to select an appropriate SCP mate between the pair. The selection process is such that traffic loads are balanced among the ports of the selected SOP mate. The load balancing also occurs between the SCP pairs.

The IP components 31, 32, 33 can be implemented in a number of different configurations. A preferred configuration, as discussed in detail later, employs three general purpose computers linked via an Ethernet Local Area Network (LAN). The IP communicates with the SCPs via a TCP/IP packet data network.

Figure 2:
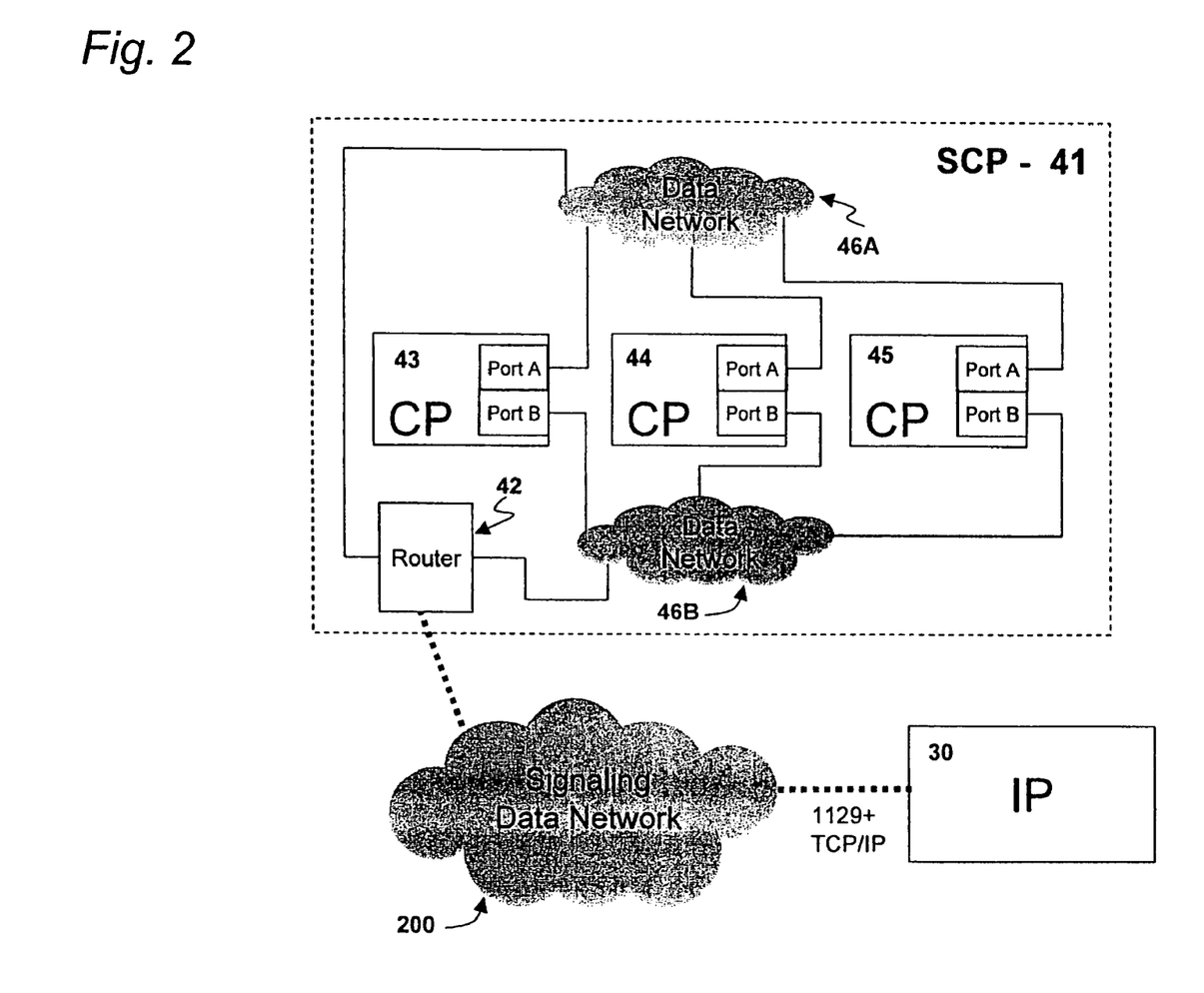
FIG. 2 is a diagram of a SCP Mated Pair used in the preferred network implementation of the present invention.

FIG. 2 illustrates a simplified SCP site. The SCP 41, for example, preferably comprises three call processors 43, 44, 45 each of which has two network interfaces, labelled ports A and B. Additionally, the SCP site contains two separate internal data networks 46A, 46B providing communication through a router 42 to the signaling data network, which is linked to the IP 30. For network fault tolerance, each of the two ports on a call processor is attached to two separate internal data networks. Although any LAN technology can be utilized for the data networks 46A, 46B, token ring is preferred. A port connection is established between the SCP and the IP for each network interface address that exists. Thus, in this configuration, the total number of port connections is six. The data networks 46A, 46B are connected to the router 42. The router 42 in turn provides data communication to an outside signaling data network, such as a TCP/IP network. The data communication interface 33 within the IP 30 connects to the same signaling data network, enabling communications between the IP 30 and the various ports of the SCP site 41.

Figure 3:
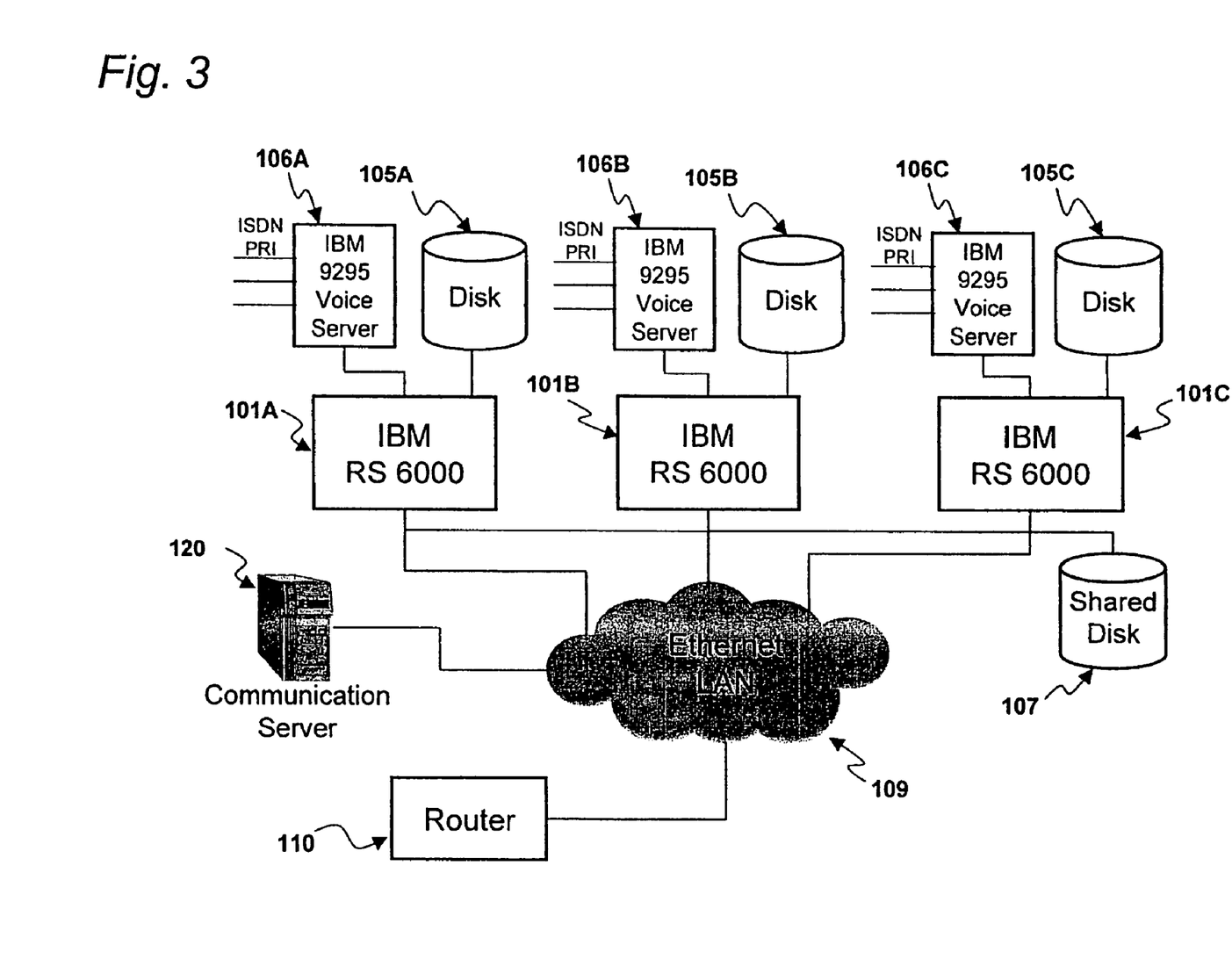
FIG. 3 is a simplified diagram of a peripheral platform used in the preferred embodiment.

One or more peripheral platforms (i.e., IPs) are added to the network to provide one or more auxiliary call processing capabilities. As shown in FIG. 1, each of the SSP type central offices 10, 11 connects to an IP 30. In the preferred embodiment, the IP houses the SCP Locator database 31 and connects to the associated SSP switch via a primary rate interface (PRI) type of Integrated Services Digital Network (ISDN) link through an appropriate interface unit in one of the Interface modules of tone switch. Each voice processing card (resident in the IBM RS 6000s), illustrated in FIG. 3, will connect to a voice server card (106A, 106B, 106C) which provides the actual interface to T1 or primary rate interface ISDN trunks to the SSP type switching office, as illustrated in FIG. 3. These interfaces are also generically represented in FIG. 1 as the voice channel interface 106 linking to SSP 11. Although the channel between the IP and the SSP is denoted "voice", it is known that ISDN link carries both voice and signaling data. The peripheral platform also connects via a packet switched data communication network, such as a TCP/IP, to the SCP. The TCP/IP data communication network forms a second signaling network separate from the SS7 network and the network of trunk circuits interconnecting the switching offices.

SSPs 10, 11 shown in FIG. 1 normally respond to a service request on a local communication line connected thereto, for example an off-hook followed by dialed digit information, to selectively connect the requesting line to another selected local communication line. The connection can be made locally through only the connected central office switching system. For example, for a call from station A to station B the SSP 10 provides the call connection without any connection to another central office. When the called line connects to a distant station, for example when station A calls station C, the connection is made through the connected central office switching system SSP 10 and at least one other central office switching system SSP 11 through the telephone trunks interconnecting the two central office switches.

In the normal call processing, the central office switching system responds to an off-hook and receives dialed digits from the calling station. The central office switching system analyzes the received digits to determine whether the call is local. If the called station is local and the call can be completed through the one central office, the central office switching system connects the calling station to the called station. If, however, the called station is not local, the call must be completed through one or more distant central offices; and further, processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited voice trunk circuit capacity. The CCIS system through the STPs was developed to alleviate this problem.

In the CCIS type call processing method, the local central office suspends the call and sends a query message through one or more of the STPs. The query message goes to the central office to which the called station is connected, referred to as the "terminating" central office. For example, for a call from station A to station C the query would go from originating SSP 10 to terminating SSP 11. The terminating central office determines whether or not the called station is busy. If the called station is busy, the terminating central office so informs the originating central office which in turn provides a busy signal to the calling station. If the called station is not busy, the terminating central office so informs the originating central office. The terminating central office provides a ringing signal to the called station, and the originating central office sends ringback tone back through the connection to the calling station. When the terminating office detects an answer on the called party's line, a telephone connection is then constructed via the trunks and central offices (and/or tandem offices) of the network between the calling and called stations.

In an AIN type system, such as shown in FIG. 1, certain calls receive specialized AIN type processing under control of data files stored in the databases within the SCPs 41, 42, 51, 52. In such a network, the SSP type local offices of the public telephone network include appropriate data in the translation tables for customers subscribing to AIN services to define certain call processing events identified as AIN "triggers". Using the translation table data from disc memory in the central office switching system, the SSP will detect such triggering events during processing of calls to or from such AIN service subscribers.

The SSP type switches can recognize a variety of events as triggers for activating a query and response type AIN interaction with the SCP. A number of different AIN triggers are used, depending on the precise type of service the AIN will provide for a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the SCP.

For ordinary telephone service calls, there would be no event to trigger AIN processing; and the local and toll office switches would function normally and process such calls as discussed above, without referring to any SCP database for instructions.

In a first mode of AIN operation, an SSP type office (CO or tandem) which detects a trigger will suspend call processing, compile a TCAP formatted call data message and forward that message via a common channel interoffice signaling (CCIS) link and STP(s) to the SCP (41, 42, 51, 52) which includes the SCP database. The SCP accesses its stored data tables to translate the received message data into a call control message and returns the call control message to the office of the network via CCIS link and STP(s). The SSP then uses the call control message to complete the particular call through the network. For AIN calls requiring a processing feature provided by the IP 30, the call control message would instruct the SSP to route the call to the associated IP 30.

The illustrated preferred embodiment includes two signaling communications systems carrying data to and from each SCP. The communications links of the first such signaling network appear in the drawing as solid lines, and the communications links of the second such signaling network appear in the drawing as dashed lines. The first signaling network provides communications between an SCP 41 and the SSPs 10, 11 and between the individual SSPs 10, 11. More specifically, SCP 41 connects to the SSPs via the SS7 network and the STPs 21, 22 as discussed above. The second signaling network provides communications between SCPs 41, 42, 51, 52 and the IP 30, utilizing the TCP/IP (Transmission Control Protocol/Internet Protocol) protocol. Other types or high speed data network can be used between the SCP 41 and the IP 30. Typically, the second signaling network provides higher capacity data transport than the first signaling communication network.

One IP 30 may communicate with any one SCP in a number of SCP Mated Pairs 40, 50, via the second signaling network. The SCP Locator Database 31 enables the IP to select an appropriate one of the SCPs, for each call processed by the IP. In the preferred embodiment, the database 31 also provides the necessary network addressing information to communicate through a selected port on the SCP, via the second signaling network.

In the preferred embodiment, the connection from the IP 30 to the SSP 11 would utilize a primary rate ISDN type trunk line for carrying both voice channels and signaling information. However, a number of alternate implementations of this connection can be used. For example, the connection may take the form of a T1 circuit carrying a number of multiplexed Centrex line channels. If additional data signaling is necessary from the switch to the IP in such an embodiment, a Simplified Message Desk interface (SMDI) link can be provided. SMDI is a standard form of maintenance port, available on many types of telephone switching systems, through which calling party number information can be supplied. For older switching systems not capable of call transfer through ISDN signaling or signaling on T1 Centrex lines, an additional switch could be added between the IP and the SSP.

In a redundant network operations mode as in the preferred embodiment, the IP will have multiple processors (as shown in FIG. 3). Accordingly, it is important that the IP is a homogeneous platform. This provides the advantage of allowing transactions destined for the IP site to be handled by any of the three processors 43, 44, 45. Each of the processors are functional equivalents of any other, and thus, can handle transactions destined for any one of the other processors configured at the site.

In addition, each of the processors configured at an IP site has the ability to control the data communication interface (or ports) assigned to the other processors at the IP site. Each IP to SCP session, once initiated by a processor, should remain under the control of that processor for the duration of the processing of that call and the session. In the event of a processor failure, a remaining processor is responsible for completion of the interrupted transaction. Each IP processor has two TCP/IP network connections to the SCP. During communications with a SCP, the IP sends a Provide Instruction message to the SCP. In turn, the SCP responds by initiating the conversation over the same network connection. In the event that the network connection fails the transaction is transparently switched over to the redundant network connection.

Furthermore, it is the task of the IP to recognize and maintain a list of active ports associated with the SCPs or SCP Mated Pairs. The IP should also assign these active ports in a round-robin order. The advantage of this distribution scheme is to load balance across SCP network interfaces. The IP also provides security measures by validating any request to open a communication session from authorized SCP call processors. That is, the IP checks whether the requesting SCP is within its authorized list of SCPs prior to establishing communication and denies communication to unauthorized SCPs.

An SCP call processor handling a session with an IP processor transmits knowledge of the session to the other two SCP call processors at that particular site; however, no information about the session is passed to the mate site. For example, if processor CP 43 in site 41 handles a call, CP 43 informs CPs 44 and 45 of its operations and communications with IP 30. However, CP 43 does not inform any of the processors in SCP site 42. During any specific IP to SCP session, only one SCP site has knowledge of the session. If the SCP call processor handling a session fails, the IP will attempt to communicate the transaction to one of the other remaining call processors at the same SCP site. The IP maintains its own load balancing logic for directing transaction to alternate SCP call processors during failure of a SCP site.

FIG. 3 illustrates a preferred embodiment of the IP used in the network of FIG. 1. In this implementation, the IP comprises three processors in the form of general purpose computers 101A, 101B, 101C such as IBM RS-6000's. Each general purpose computer (or processor) will include a digital voice processing card for sending and receiving speech and other audio frequency signals, such as an IBM D-talk 600. Each voice processing card will connect to a voice server card of an IBM 9295 Voice Server (e.g., 106A, 106B, 106C). The voice server card provides the actual interface to T1 or primary rate interface ISDN trunks to the SSP type switching office. The plurality of computers may have associated dedicated disk storage 105A, 105B, 105C as well as a shared disk memory 107. Each computer will also include a network interface card (i.e., data communication interface) for providing two-way communications over an internal data communications system, such as an Ethernet type local area network 109. The Ethernet 109 carries communications between the individual computers, and occupies a port on router 42, which provides an interconnection to the second signaling communications network 200 going to the SCPs.

The illustrated IP in FIG. 3 further includes a communication server 120. The communication server 120 controls communications between the modules within the IP and the second signaling communication system 200 via the Ethernet LAN 109.

Using the +1129 protocol, the IP may query a SCP in response to a call. Thus, during a call, a trigger event occurs. The SSP queries the SCP which responds by instructing the SSP to route the call to the IP, using standard TCAP protocol messages. When the SSP routes the call to the IP, the IP queries the SCP and receives one or a sequence of instructions as to how to process the particular call. A modified protocol specified in Bellcore TA-XWT-001129, which is similar to TCAP but has a somewhat smaller message set, may be used for communications between an SCP and an SSP as an enhancement over the standard TCAP message sec.

As an alternative or in addition to the +1129 protocol, communications between the IP and the SCP may utilize generic data interface (GDI). The GDI command set is simpler and more generic, and the commands can carry more data. Also, the SCP can initiate communications using GDI. This permits a wider variety of routing and processing routines. In prior systems, the SCP (or its mate) which caused the SSP to connect a call to the IP would communicate with the IP to control IP processing of the call. In accord with the invention, however, the IP analyzes call related data and picks an appropriate one of the many available SCPs, in response to each new incoming call.

Figure 4:
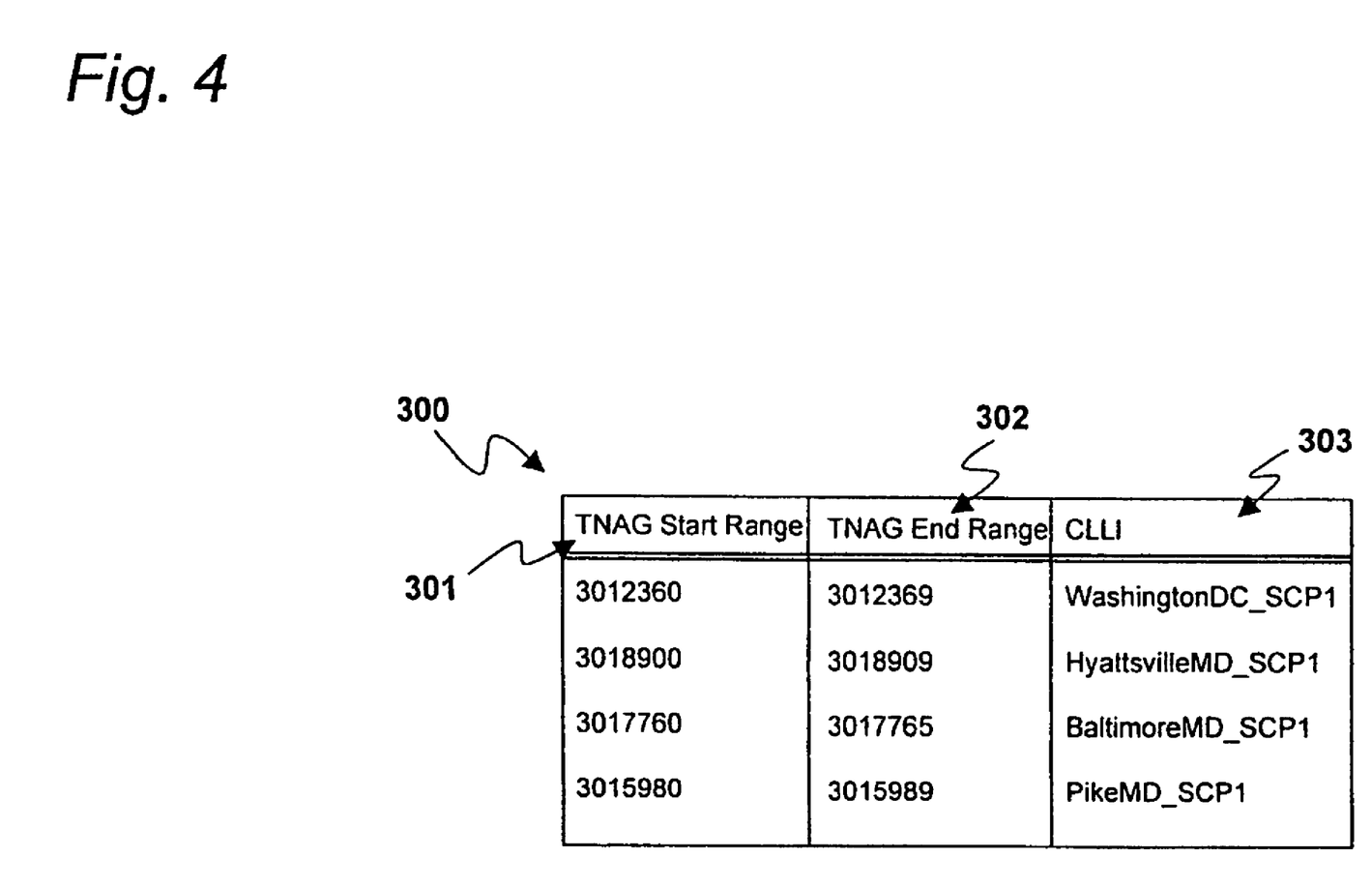
FIG. 4 is an illustration of the Telephone Number Assignment Group (TNAG) Range table.
Figure 7:
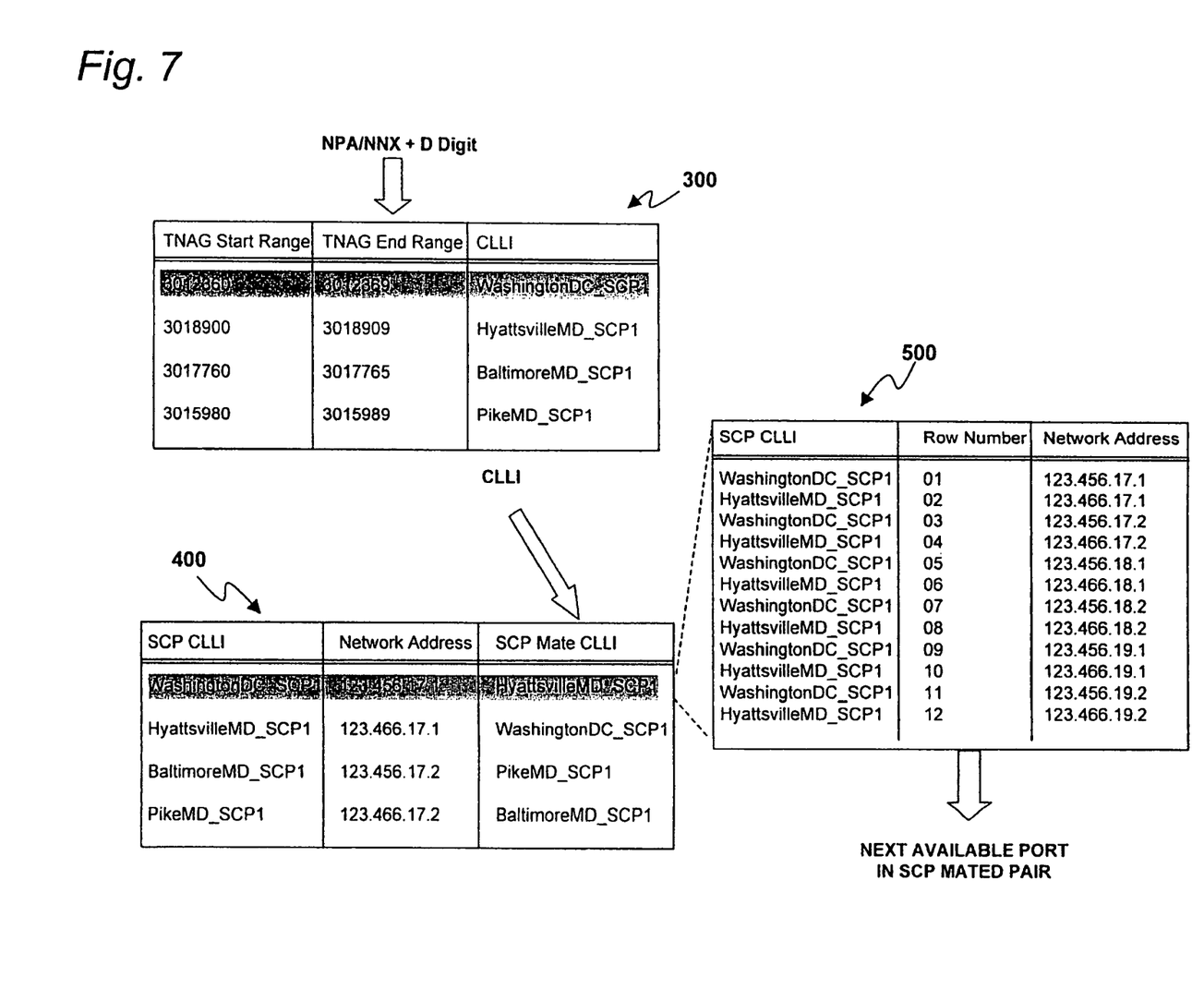
FIG. 7 is a diagram of the relationships of the SCP Locator Database tables.

The IP 30 determines which SCP to query based on a multi-table data structure, which uses the NPA/NXX plus the "D" digit value as the key to access the tables. Essentially, two routing queries are executed using the TNAG Range and the SCP Common Language Location Identifier (CLLI) to Network Address Translation tables. The CLLI is an identification code that is uniquely assigned to the components of the AIN. FIG. 7 illustrates the relationship among the routing tables resident in the SCP Locator database 31 for an exemplary set of data. The routing process will query Telephone Number Assignment Group Table 300 (TNAG=NPA/NXX plus the "D" digit) for the corresponding NPA, as illustrated in FIG. 4. Specifically, the TNAG Start Range 301 designates the beginning of the NPA/NXX range; correspondingly, TNAG End Range 302 denotes the end of the range. The third column of the TNAG Table 300 is the CLLI 303. The Telephone Number Assignment Group (key field) corresponds to the CLLI 303. A TNAG table is created for each NPA. For example, FIG. 4 represents such a table for a NPA of 301. If another NPA were 703, a separate table would be created. The TNAG table thus records an assignment of each range of NPA/NXX values to one SCP piece of equipment, designated by the CLLI code of that piece of equipment.

Figure 5:
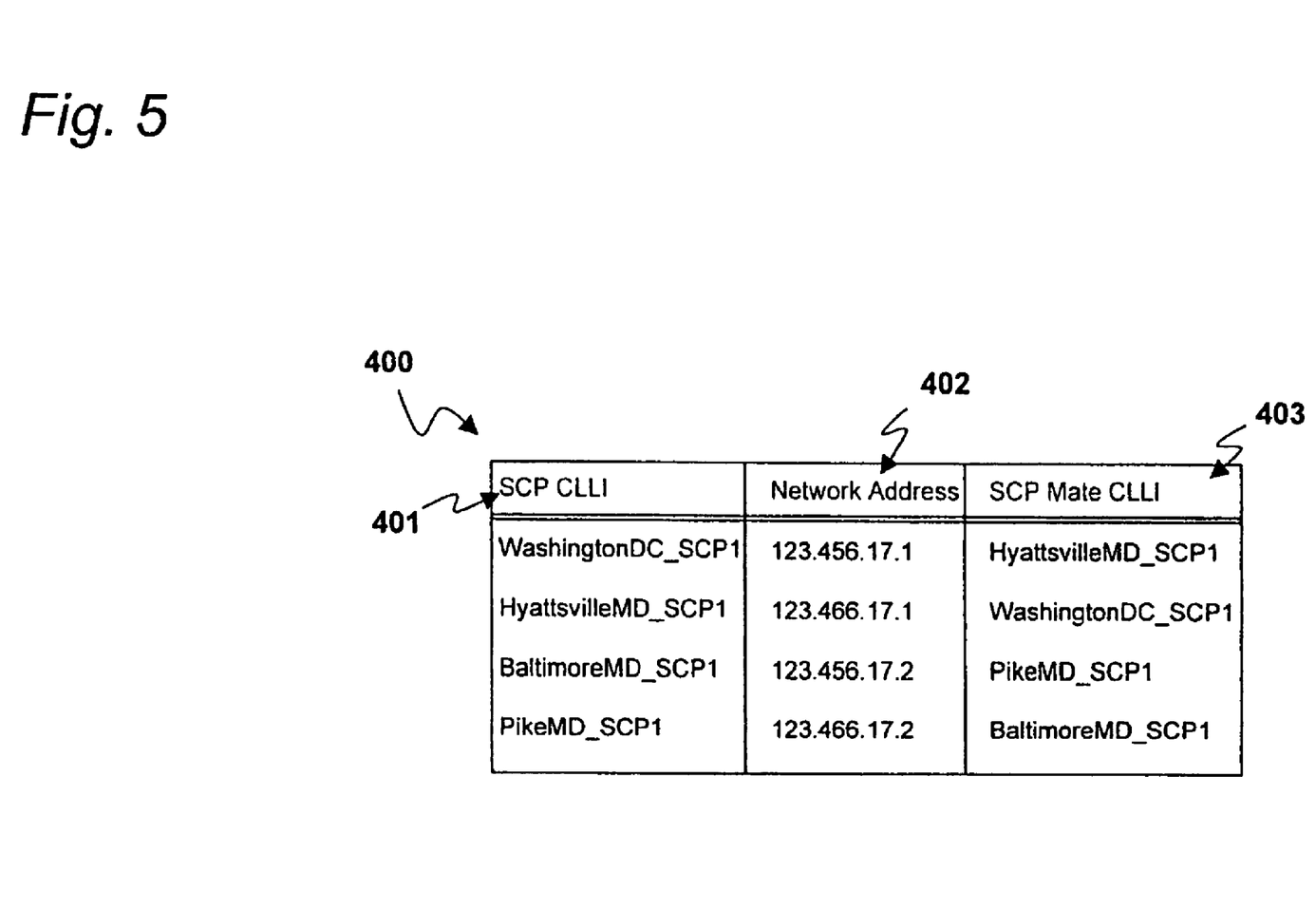
FIG. 5 is an illustration of the SCP CLLI to Network Address Translation table.
Figure 6:
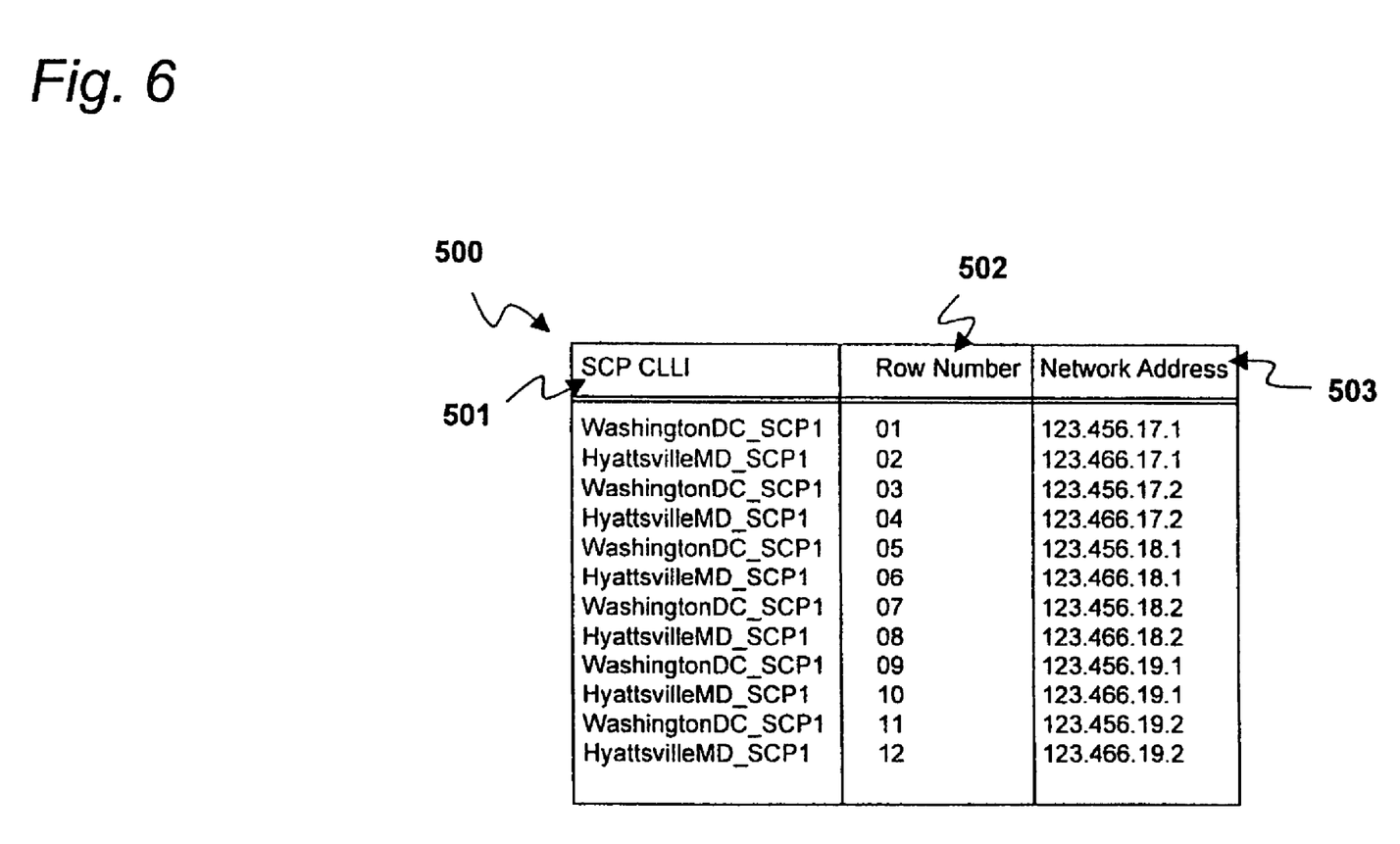
FIG. 6 is an exemplary illustration of a Link List related to the SCP Mated Pair table.
Figure 9:
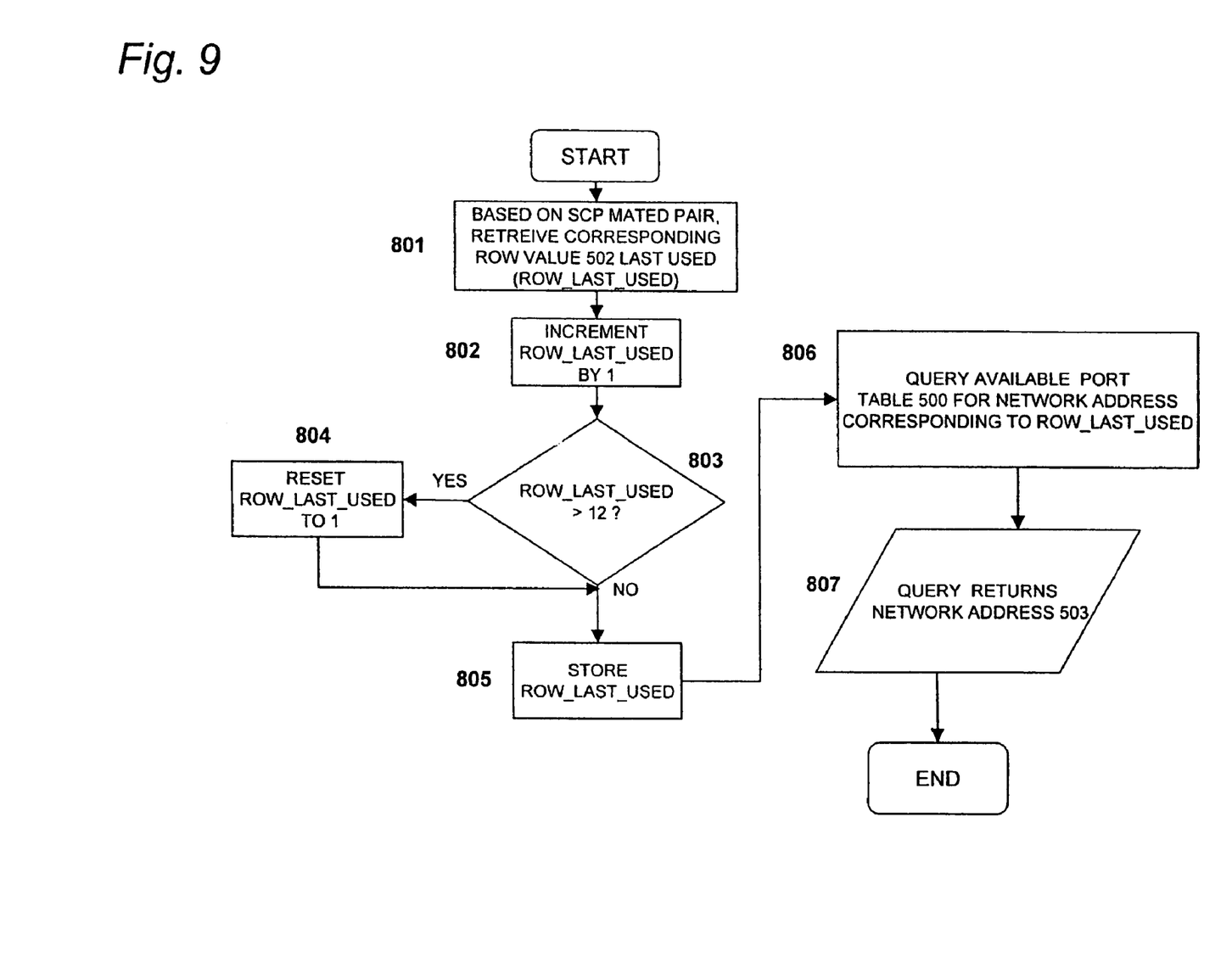
FIG. 9 is a detailed flow chart of the preferred embodiment of the network address selection process.

The second query involves a look-up in the SCP CLLI code to Network Address Translation table 400. The CLLI code uniquely identifies a site of one SCP, typically within a Mated Pair. The SCP CLLI to Network Address Translation table lists the CLLI code and associated Network Address for the mated SCP site. To reduce network response time, the SCP CLLI code to Network Address table, as shown in FIG. 5 is used to generate a link list table 500 (see FIG. 7) for each SCP Mated Pair at process initiation. Each of the link lists for the mated pairs has a key based on Network Address, an alternate key of Row Number, and a foreign key of SCP. To build this list, the SCP to Network Address table is first queried with the CLLI key, yielding the Network Address and SCP Mate CLLI. Using the foreign key of SCP Mate CLLI, the network address of the mate is found. These queries are executed until the link list is built for each mated pair. The network address in the link lists represents an available port on the SCP. Alternatively, an identification key associated with the port can be added to the link list. FIG. 9 represents the network address selection process using a round robin scheme for load distribution; the algorithm resides within the call processor. Alternatively, the algorithm may be located elsewhere, as discussed later on. It should be noted any number of schemes can be employed to select the SCPs network interface addresses.

Figure 8:
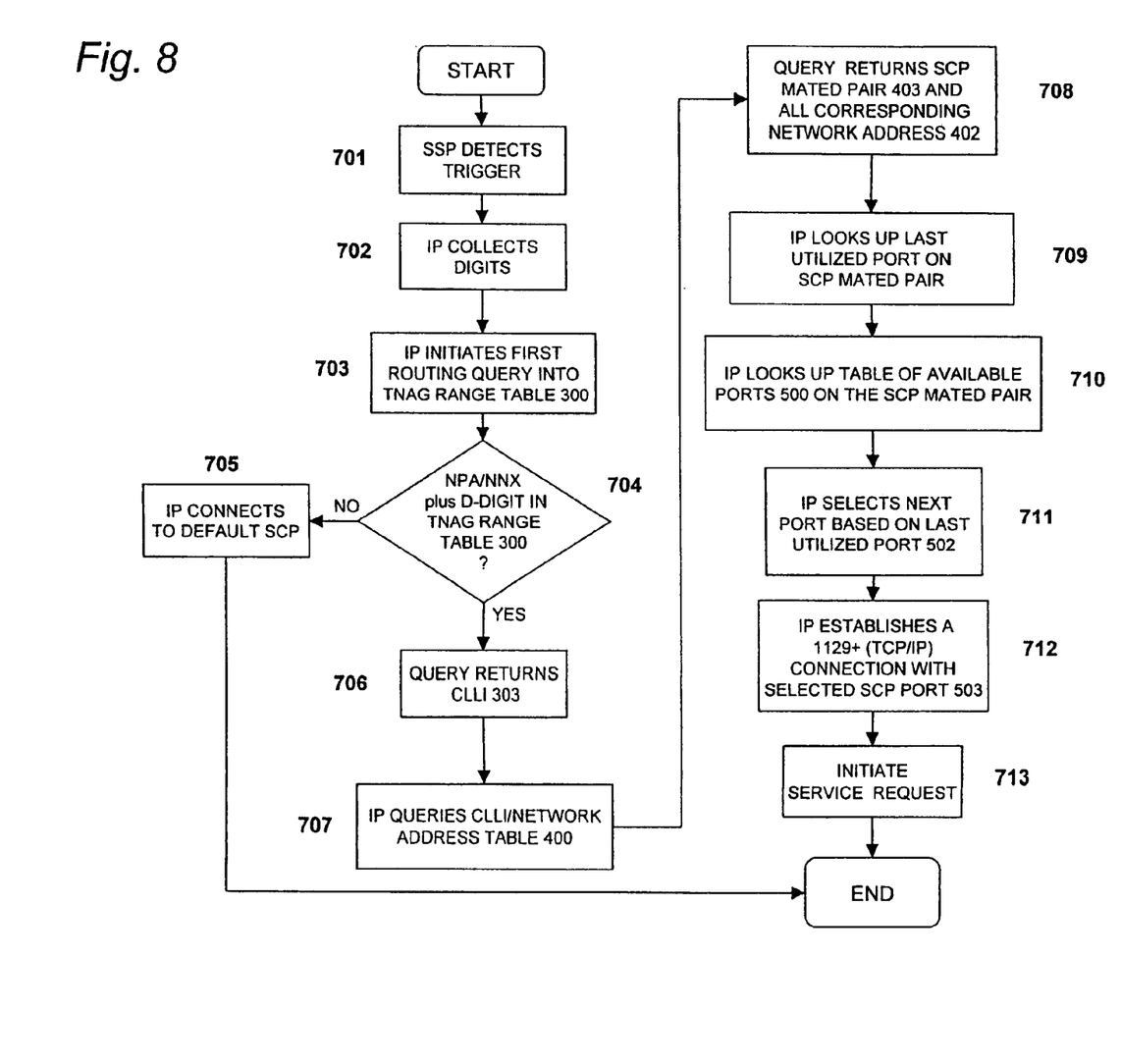
FIG. 8 is a simplified flow chart diagramming the data process, in an IP to select a SCP Mated Pair and associated network address.

The interaction among the IP, SSP, and SCP Locater Database is captured in FIG. 8. The SSP first detects an AIN trigger by a subscriber (701). In response, the IP performs the step 702 of digit collection, and subsequently, initiates a routing query of the SCP Locator Database—specifically, the TNAG Range table (703). If the NPA/NXX plus D-digit string is not within the TNAG Range table (704), the IP communicates with a predesignated default SCP for further instructions (705). However, if the string is within the TNAG Range table, per step 706, the IP receives a CLLI code corresponding to the string. This event causes the IP to launch another query of the SCP Locator Database's CLLI/Network Address Translation table. The query returns, as illustrated in 708, the SCP Mated Pair along with its network addresses. Using this information, the IP executes an algorithm to select an SCP network interface address (i.e., communication port). This algorithm is generally described in steps 709-711. After selecting the port, the IP initiates a TCP/IP connection with the selected SCP port (712). The subscriber then initiates any desired service requests to the SCP (713).

FIG. 9 details the network address selection algorithm utilized in steps 709, 710, and 711. A variety of algorithms could be used. In this embodiment, the algorithm is a round-robin distribution scheme to effect load balancing across the communication ports of the SCP Mated Pair. Per step 801, the IP looks up a Row_Last_Used value, which denotes the Row Number value that was last used in determining the network address of the SCP Mated Pair. This Row_Last_Used parameter can be implemented in any number of ways; e.g., as part of a database table, variable parameter of source code, etc. Once retrieved, this value is incremented by 1 (802) to obtain a new Row_Last_Used value (802, 803, 834, 805). The new value of Row_Last_Used is used as the foreign key of Row Number for the query of the link list table 500. That is, the Row_Last_Used value is used as the input parameter for the network address query (806). The selection process, thus, outputs a network address (807) associated with the selected SCP CLLI code via the Row_Last_Used value.

Figure 10:
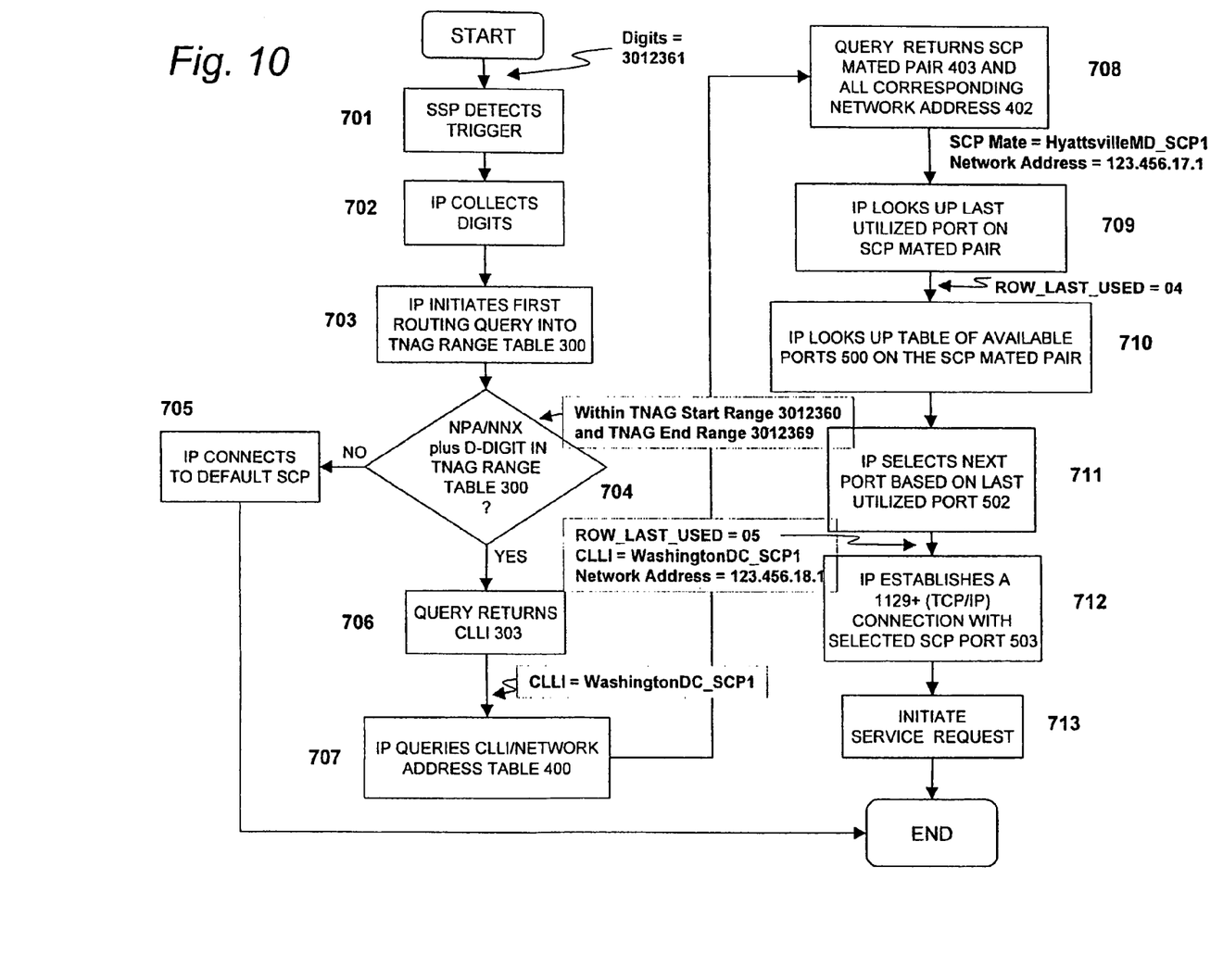
FIG. 10 is an example using the detailed flow chart of the network address selection process.

FIG. 10 provides an exemplary illustration of the data flow detailed in FIG. 8. A subscriber dials a telephone number causing an AIN trigger. Assume for this example that the dialed number having an NPA/NXX plus the "D" digit of 3012361. The network routes the call to the IP, as discussed above, and supplies the digits to the IP. After digit collection by the IP, it then executes its first query to the TNAG Range Table 300. Because "3012361" falls between a listed range of 3012360 and 3012369 in the table, the query (706) returns a CLLI code of "WashingtonDC_SCP1". The next steps (707, 708) involve querying the SCP CLLI to Network Address Translation table 400, yielding the CLLI code of the mated pair and its network address. In this embodiment, the IP locks up a value (Row_Last_Used=04) corresponding to the last selected SCP network address, which was 123.456.17.1. Next, the IP executes a round-robin distribution scheme to determine a new value, which corresponds to a new SCP network address of 123.456.18.1. Using this network address, the IP communicates with the Washington D.C. SCP site. After establishment of such communication with the SCP, the IP is able to process subscriber service requests.

The SCP and network interface address selection algorithm, in which FIG. 9 is one embodiment, is not limited to any specific combination of hardware circuitry and software. The algorithm may reside in any computer-readable medium for access by the processors 101A, 101B, 101C, such as the individually attached disks (105A, 105B, 105C), or the shared disk 107. The term "computer-readable medium" as used herein refers to any medium that participates in providing instruction to a processor for execution. Such a medium may take many forms, including but not limited to, non-volatile media, volatile media, and transmission media. Nonvolatile media includes, for example, optical or magnetic disks, such as storage device. Volatile media includes dynamic memory, such as main memory. Transmission media includes coaxial cables, copper wire and fiber optics, including the wires that comprise a bus of the computer. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave, or any other medium from which a computer can read.

Another embodiment of the invention places the SCP Locator database containing the routing query tables at a SCP, for example in memory or on disk associated with the processors CP (FIG. 2). The IP queries the SCP routing tables with an 1129+ Provide Instruction to its local SCP. The IP first queries the SCP for SCP location that handles the specific NPA/NXX involved with the service. The SCP would return with the network address.

The AIN topology illustrated in FIG. 1 is exemplary in nature, and other network topologies can be used. For example, the illustrated networks include SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the SCP, as in the implementation described above. Furthermore, the SCP can be an integrated services control point (ISCP) in more advanced implementation of the AIN. For the SSP capable end office switches that may be present in the network, they communicate directly with the SCP, in the same manner as in the embodiment of FIG. 1. In such networks, each peripheral platform or IP could connect to one or more of the non-SSP end offices, one or more SSP capable end offices and/or to the SSP capable tandem. The SSP capable tandem office switch is a digital switch, such as the 5ESS switch from AT&T; and the non-SSP type end offices might be 1A analog type switches.

Although several preferred embodiments of the invention have been described in detail above, it should be clear that the present invention is capable of numerous modifications as would be apparent to one of ordinary skill in the art. Such modifications fall within the purview of the appended claims.

What is claimed is:

1. A method comprising the steps of:
    collecting data identifying a subscriber's telephone station;
    accessing data records related to the telephone station and a plurality of service control points from a database;
    selecting a particular service control point among the plurality of service control points;
    selecting one of a plurality of network interfaces of the particular service control point by;
    (a) computing a database value corresponding to the particular service control point; and
    (b) querying the database using the database value to obtain a network address; and
    establishing a signaling data connection between a data communication interface of a peripheral platform coupled to a telephone network and a network interface of the particular service control point having the network address.

2. The method as in claim 1, wherein the accessing step comprises querying a database within one of the service control points.

3. The method as in claim 1, wherein the step of computing uses a scheme to distribute loading among the plurality of network interfaces.

4. The method as in claim 3, wherein the scheme is round-robin.

5. The method as in claim 1, wherein the step of establishing uses a TCP/IP protocol.

6. The method as in claim 1, wherein the step of selecting a particular service control point among the plurality of service control points includes querying the database using the collected data to identify the particular service control point corresponding with the collected data.

7. The method as in claim 6, wherein the collected data includes at least a subset of digits associated with the telephone station.

8. The method as in claim 6, wherein the database includes a table having data representative of the plurality of service control points and at least portions of telephone numbers organized into a plurality of telephone number assignment groups, each of the service control points being associated with a corresponding telephone number assignment group in the table.

9. The method as in claim 1, wherein the database value includes a Common Language Location Identifier (CLLI) code for the particular service control point.

10. The method as in claim 1, wherein the step of querying the database using the database value to obtain a network address includes:
    building a list of network addresses associated with the plurality of network interfaces for the particular service control point; and
    selecting the network address from the list.

11. The method as in claim 10, wherein the step of querying the database using the database value to obtain a network address further includes:
    identifying a predetermined mated service control point for the particular service control; and
    including network addresses associated with a plurality of network interfaces of the mated service control point in the list.

12. A tangible volatile or non-volatile computer readable storage medium having stored therein sequences of instructions for a peripheral platform comprising a processor and a data communication interface for enabling the peripheral platform to communicate to a plurality of service control points having a plurality of network interfaces, the sequences of instructions for causing the peripheral platform to perform the steps of:
    collecting data identifying a subscriber's telephone station;
    accessing data records related to the telephone station and plurality of service control points from a database;
    selecting a particular service control point among the plurality of service control points;
    selecting one of a plurality of network interfaces of the particular service control point by;
    (a) computing a database value corresponding to the particular service control point, and
    (b) querying the database using the database value to obtain a network address; and
    establishing a signaling data connection between a data communication interface of a peripheral platform coupled to a telephone network and the network interface of the particular service control point having the network address.

13. The tangible volatile or non-volatile computer readable storage medium as in claim 12, wherein the accessing step comprises querying a database within the peripheral platform.

14. The tangible volatile or non-volatile computer readable storage medium as in claim 12, wherein the accessing step comprises querying a database remote from the intelligent peripheral.

15. The tangible volatile or non-volatile computer readable storage medium as in claim 12, wherein the step of computing comprises distributing signaling communication loading among the plurality of network interfaces.

16. The tangible volatile or non-volatile computer readable storage medium as in claim 15, wherein the distributing uses a round-robin procedure.

17. The tangible volatile or non-volatile computer readable storage medium as in claim 12, wherein the step of establishing uses a TCP/IP protocol.

18. A peripheral platform system for use with a telephone network, said peripheral platform comprising:
    a telephone network interface;
    a processor coupled to the telephone network interface for controlling processing of calls through the telephone network interface;
    a database accessible to the processor;
    a program stored on the platform, for causing the processor to select a service control point among a plurality of the service control points in response to each call, wherein the program causes the processor to select a network address from a plurality of network addresses associated with the selected service control point by determining a database value corresponding to the selected service control point and querying the database using the database value to obtain the network address; and
    a data communication interface coupled to the processor;
    wherein the processor executes the program to establish a data connection via the data communication interface with the selected service control point using the network address.

19. The system as in claim 18, wherein the processor and the data communication interface reside in a general purpose computer.

20. The system as in claim 18, further comprising a plurality of the processors, wherein each processor is coupled to at least two data communication interfaces.

21. The system as in claim 18, wherein the database is remote from the processor.

22. A system comprising:
    a telephone network interface;
    a processor coupled to the telephone network interface for controlling processing of calls through the telephone network interface;
    a data communication interface coupled to the processor;
    a database accessible to the processor, the database including
        a first table having data representative of a plurality of telephone number assignment groups and a plurality of service control points, each of the telephone number assignment groups being associated with a corresponding one of the service control points, and
        a second table having data representative of the plurality of service control points and a plurality of network addresses, each of the service control points being associated with at least one of the network addresses; and
    a program stored on the platform, the program being configured to cause the processor collect data identifying a subscriber telephone station,
        query the first table using the collected data to identify, from among the plurality of service control points, an identifier representative of a particular one of the service control points,
        query the second table using the identifier, the query generating a list of the network addresses that correspond with a plurality of network interfaces of the particular service control point,
        select one of the network addresses from the list using a predetermined algorithm, and
        establish a signaling data connection between the data communication interface and one of the plurality of network interfaces of the particular service control point that corresponds with the selected network address.

* * * * *